United States Patent
Arugula

(10) Patent No.: US 11,893,361 B2
(45) Date of Patent: Feb. 6, 2024

(54) APPLICATION USABILITY TRACKER

(71) Applicant: SAP SE, Walldorf (DE)

(72) Inventor: Srikanth Arugula, Navi Mumbai (IN)

(73) Assignee: SAP SE, Walldorf (DE)

(*) Notice: Subject to any disclaimer, the term of this patent is extended or adjusted under 35 U.S.C. 154(b) by 78 days.

(21) Appl. No.: 17/540,038

(22) Filed: Dec. 1, 2021

(65) Prior Publication Data

US 2023/0168864 A1    Jun. 1, 2023

(51) Int. Cl.
| | |
|---|---|
| *G06F 8/20* | (2018.01) |
| *G06F 16/28* | (2019.01) |
| *G06F 8/38* | (2018.01) |
| *H04L 67/50* | (2022.01) |
| *G06F 3/0486* | (2013.01) |
| *G06F 3/0485* | (2022.01) |

(52) U.S. Cl.
CPC ............... *G06F 8/20* (2013.01); *G06F 8/38* (2013.01); *G06F 16/285* (2019.01); *H04L 67/535* (2022.05); *G06F 3/0485* (2013.01); *G06F 3/0486* (2013.01)

(58) Field of Classification Search
CPC . G06F 8/20; G06F 16/285; G06F 8/38; G06F 3/0485; G06F 3/0486; H04L 67/535
See application file for complete search history.

(56) References Cited

U.S. PATENT DOCUMENTS

| | | | |
|---|---|---|---|
| 10,885,448 B2 | 1/2021 | Germanakos et al. | |
| 2005/0004879 A1* | 1/2005 | Mathias | G06Q 30/0283 714/E11.2 |
| 2005/0183143 A1* | 8/2005 | Anderholm | G06F 11/3438 726/22 |
| 2008/0005020 A1* | 1/2008 | Auvenshine | G06Q 30/04 705/40 |
| 2012/0221955 A1* | 8/2012 | Raleigh | H04M 15/00 726/1 |
| 2015/0106500 A1* | 4/2015 | Fakhouri | H04L 67/34 709/224 |

OTHER PUBLICATIONS

Latin, M., "Ux Collective—Measuring and Quantifying User Experience," https://uxdesign.cc/measuring-and-quantifying-user-experience-8f555f07363d, 12 pages, Nov. 25, 2017.
Moran, K., "Quantitative User-Research Methodologies: An Overview," https://www.nngroup.com/articles/quantitative-user-research-methods/, 16 pages, Apr. 22, 2018.

(Continued)

*Primary Examiner* — Phillip H Nguyen
(74) *Attorney, Agent, or Firm* — Sterne, Kessler, Goldstein & Fox P.L.L.C.

(57) ABSTRACT

Disclosed herein are system, method, and computer program product embodiments for tracking application usability. In some embodiments, a usability tracker listens for input events associated with the application broadcast by an operating system on which the application is being executed. The usability tracker captures data associated with the input events. Moreover, the usability tracker transmits the data associated with the input events to a central hub. The central hub aggregates and displays the data associated with the input events on a dashboard.

19 Claims, 14 Drawing Sheets

(56) References Cited

OTHER PUBLICATIONS

Seffah, A. et al., "Usability measurement and metrics: A consolidated model," Software Quality Journal (2006) 14, pp. 159-178, Jun. 2006.

Usability Measure—an overview | ScienceDirect Topics, https://www.sciencedirect.com/topics/computer-science/usability-measure, 25 pages, printed Oct. 19, 2021.

* cited by examiner

Details

Session Time: 6mins 52secs

| Clicks Count | Cursor Travel (clicks/px) |
|---|---|
| 12 | 4837 |

| Total distance between clicks(px) | Average Travel between clicks(px) |
|---|---|
| 2590 | 403 |

| Cursor Drag clicks(px) | Scroll length(px) |
|---|---|
| 257 | 160 |

Details

Session Time: 4mins 13secs

| Clicks Count | Cursor travel (Clickstream) |
|---|---|
| 7 | 2997 |

| Pixel distance between clickstream | Average Travel between clickstream |
|---|---|
| 1666 | 414 |

| Cursor Drag (clickstream) | Scroll Length (px) |
|---|---|
| 0 | 248 |

FIG. 5D

APPLICATION USABILITY TRACKER

BACKGROUND

Application design often requires user feedback once an application has been deployed. Due to the lack of data, user interface (UI)/user experience (UX) designers have to rely on experience, standard guidelines, and use cases described on paper to design the application's structure. This cannot be tested with actual usage patterns until released to users or with test teams to work with the applications. In this regard, UI/UX designers do not have any solid data points to understand which sort of design patterns or which modifications can greatly improve the efficiency of operation of business functions within the application. Furthermore, there is no way to measure the application's performance with respect to the usage patterns. This can lead to an application designer creating inefficient or error-prone user interfaces.

BRIEF DESCRIPTION OF THE DRAWINGS

The accompanying drawings are incorporated herein and form a part of the specification.

FIGS. 5A-5D are block diagrams illustrating an application being tested and the dashboard rendering the metric data, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
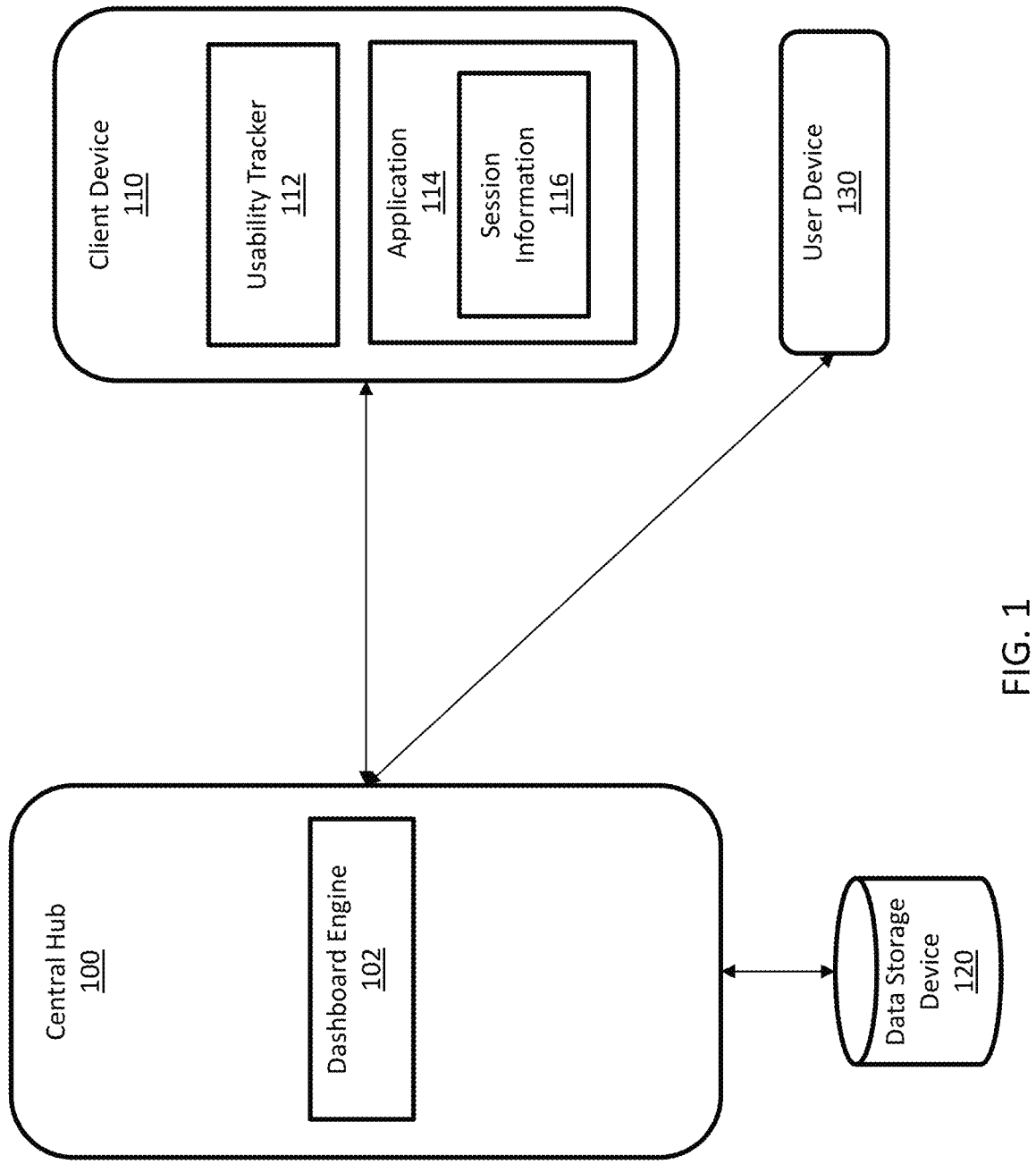
FIG. 1 is a block diagram of an architecture of a system for tracking application usage data, according to some embodiments.

Provided herein are system, apparatus, device, method and/or computer program product embodiments, and/or combinations and sub-combinations thereof, for tracking application usability.

As described above, UI/UX designers do not have any solid data points to know which sort of design patterns or which modifications can greatly improve the efficiency of operation of business functions within the application. Specifically, a UI/UX designer may fail to address or fix usability issues on an application's interface due to the lack of data. This may include how data is organized, accessed, or displayed on the interface. As a result, users may be turned away from using the application. For e-commerce applications, this may result in a significant loss of business.

Conventional systems that track application usage capture limited data about an application. For example, conventional systems may merely track the selection of links or the page flow. However, conventional systems do not provide insight into how well the application functions are designed to suit application usage. Furthermore, conventional systems provide qualitative data through collaborative tools and user feedback.

Moreover, conventional systems also require the application tracking to be developed within the application or integrate the application with externally available solutions. This can be a burdensome and time-consuming task to develop and/or integrate a tracking system for each individual application.

Additionally, conventional systems often need to work on security issues associated with capturing live application usage data. This may require obtaining permission, which may or may not be granted, from users to capture their usage data. This can lead to receiving an unevenly represented or an incomplete set of data.

Furthermore, conventional systems often test the UI/UX of the application after the application has been released to the public. In the event the UI/UX is inefficient, many users have already turned away before the UI/UX application designer has a chance to improve the UI/UX.

Embodiments described herein solve these problems by providing a universal tool that captures application usage data from input devices. In some embodiments, a usability tracker receives a request to track the application's usability during a usage session. The usability tracker listens for one or more input events broadcast by an operating system on which the application is being executed. The one or more events correspond to an application function. The usability tracker captures data associated with the one or more input events. Furthermore, the usability tracker stores the data associated with the one or more input events and the one or more input events in a local storage device. The data associated with the one or more input events and one or more input events are correlated to the usage session and the application function in the local storage device. Moreover, the usability tracker transmits the data associated with the one or more input events and the one or more input events to a central hub.

In some embodiments, a central hub receives data associated with a usage sessions of an application. The data is associated with input events executed during the usage sessions. The central hub groups the data into sets of data based on an attribute. Furthermore, the central hub groups the sets of data into a plurality of subsets of data based on data type. Each subset corresponds with a different data type which can be associated to the session type or the channel of input data that is captured. The central hub causes the display of an interface comprising the plurality of subsets of data.

In some embodiments, a usability tracker receives a request to track the usability of the application. The usability tracker captures data associated with one or more input events over a plurality of user sessions. Each input event of the one or more input events is broadcast by an operating system on which the application is being executed. The one or more input events correspond with an application function. The usability tracker stores the data associated with the one or more input events in a local storage device. The data associated with the one or more input events is correlated to a respective usage session of the plurality of user sessions and the application function. A central hub groups the data into sets of data based on an attribute. The central hub groups the sets of data into subsets of data based on data type. Each subset of the plurality of subsets corresponds with a different data type. Furthermore, the central hub causes display an interface comprising the plurality of subsets of data.

The embodiments described herein provide a universal tool that can track the application usage of any type of application. Furthermore, the embodiments herein provide quantitative data points about the usability of an application. The embodiments described herein allow for capturing application usage data based on data received from input devices. The data is collated together and provided to the designer to help them pinpoint the areas in the application that are not performant and thereby help identify the root cause of any bad user experiences. In this regard, the embodiments described herein capture raw device data to provide hard data points that measure problems with application interfaces at the design phase of the application. This provides information about usage of different application functions and how well the application functions perform based on the data points.

FIG. 1 is a block diagram of an architecture of a system for tracking application usage data, according to some embodiments. In an embodiment, the architecture may include a central hub 100, client device 110, and data storage device 120. The devices in the architecture can be connected through wired connections, wireless connections, or a combination of wired and wireless connections.

As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Client device 110 may include usability tracker 112 and application 114. Client device 110 may be operated by a UI/UX application designer. The UI/UX application designer may be in the process of designing and testing the UI/UX for application 114.

Usability tracker 112 is a local application residing on client device 110. Usability tracker 112 may be configured to track the usage of application 114. Usability tracker 112 may listen for input events broadcast by the operating system of client device 110.

The input events may be received by Input/Output (I/O) peripheral devices connected to client device 110. For example, the I/O peripheral devices may be a mouse, keyboard, touchpad, stylus, screen touch, etc. The input events may be any input received from the I/O device with respect to application 114. The input events may be movement of the input device, scrolling, panning, zooming, mouse clicks, screen touch, keyboard input, etc. Usability tracker 112 may also capture idle events with respect to application 114. For example, usability tracker 112 may track the duration of time spent on a page of application 114 or in a particular session of application 114.

Usability tracker 112 may capture the data associated with the input events and idle events. Usability tracker 112 may store the data associated with the input events in session information 116. Session information 116 may be a local storage device configured to store data associated with an application usage session. The data may include a session identifier, user information of user interacting with application 114, data associated with the input events and idle events, etc. The data associated with the input events and idle events may include the number of clicks performed, average and total straight line distance between clicks, number of key press registered, number of shortcuts used, simultaneous touch events (in case of touchscreens), etc. Usability tracker 112 may transmit the data to central hub 100.

Central hub 100 may be one or more servers. Central hub 100 may include dashboard engine 102. Dashboard engine 102 may be configured to receive the data from usability tracker 112. Dashboard engine 102 may be configured to receive data from numerous different client devices 110. Dashboard engine 102 may aggregate, process, and analyze the data. Dashboard engine 102 may generate a dashboard (e.g., graphical user interface (GUI)) that renders the analyzed data to illustrate application 114's usage efficacy. The UI/UX application designer or other users may access the dashboard using client device 110 or user device 130. User device 130 may be operated by UI/UX application designers to access the dashboard.

Data storage device 120 may be one or more data storage devices configured to store structured and unstructured data. Dashboard engine 102 may store the analyzed data in data storage device 120.

Figure 2:
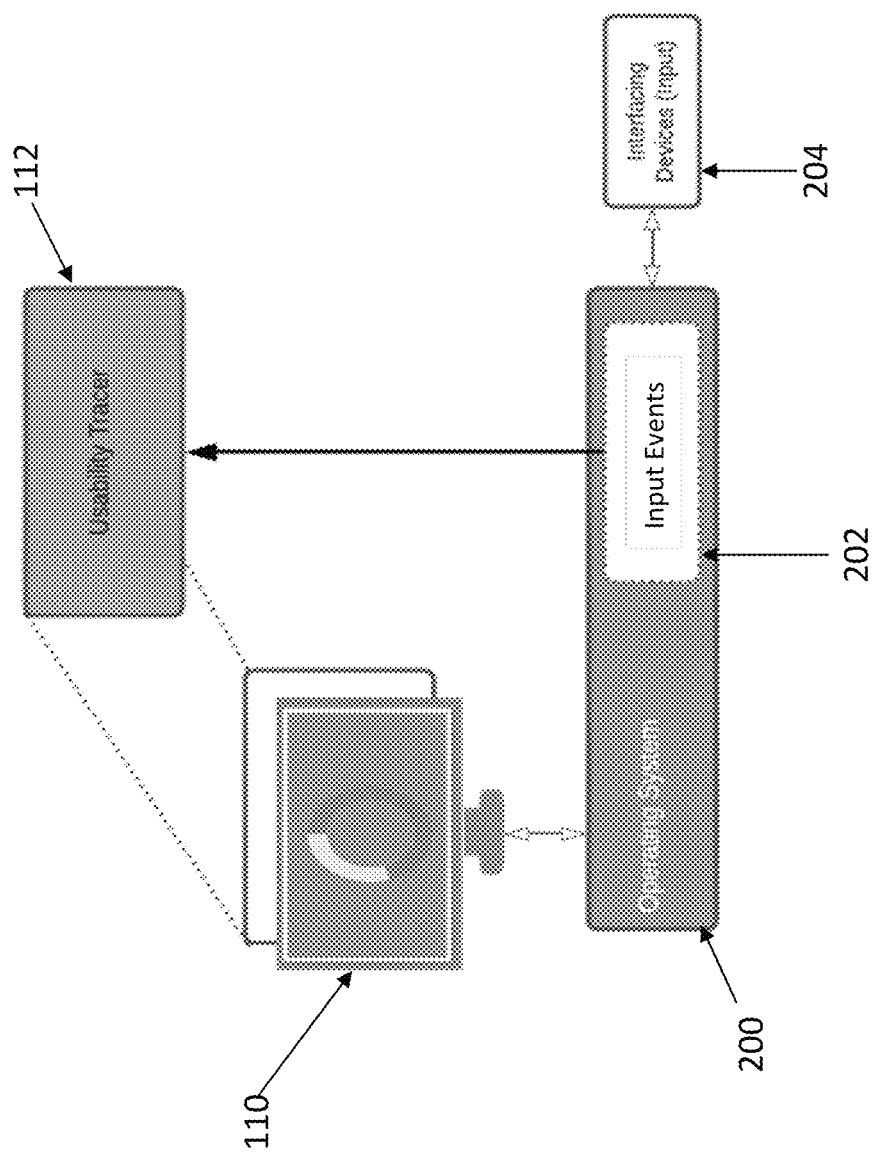
FIG. 2 is a block diagram illustrating the data flow to usability tracker 112 for tracking application usage, according to some embodiments.

FIG. 2 is a block diagram illustrating the data flow to usability tracker 112 for tracking application usage, according to some embodiments. FIG. 2 shall be described with reference to FIG. 1.

As indicated with respect to FIG. 1, client device 110 may include usability tracker 112 and application 114. Client device 110 may also include operating system 200. Operating system 200 may be configured to broadcast interface (e.g., input) events 202 received from input (or interface) devices 204. Input devices 204 may be I/O peripheral devices.

Operating system 200 may issue system broadcasts based on interface events 202 received from input devices 204. The system broadcasts may be messages that are transmitted to applications that are subscribed to receive the system broadcasts. The message may include the type of event and the relevant input device.

In some embodiments, a UI/UX application designer may be in the process of designing and testing the usability of application 114. The UI/UX application designer may interact with usability tracker 112 to initiate tracking the usage of application 114 for a specific application function. As such, usability tracker 112 may receive a request to track the usage of application 114 for an application function during a usage session.

A usage session may involve the user logging into application 114 with a particular user profile. The user profile may be associated with the UI/UX application designer. Alternatively, the user profile may be a pseudo profile based on a test case. The user profile may include the user name, location (e.g., address), age, etc. In some embodiments, user login may not be necessary for interacting with application 114. In some embodiments, a usage session may be tied to a project. Projects may be specific application functions that are being tested.

Application 114 may include multiple pages or screens. Application 114 may include one or more application functions (or processes). An application function may be a process of the application. The application function may require different steps to complete or execute. For example, an application function may include the search functionality of application 114, browsing and navigating pages of application 114, providing input on application 114, etc. Moreover, in the event application 114 is an e-commerce application, an application function may include the process of searching for products, the checkout process, product selection, etc.

Usability tracker 112 may listen for input events 202 broadcast by operating system 200. As indicated above, input events 202 may be received by input devices 204. Usability tracker 112 may receive the broadcast input event 202 as a message. The message may indicate details about input event 202 and input device 204 that caused the event. In some embodiments, usability tracker 112 may be subscribed to receive input events 202 associated with application 114. In other embodiments, usability tracker 112 may receive all input events 202 broadcasted by operating system 200, and usability tracker 112 may filter out input events 202 not associated with application 114. Usability tracker 112 may also filter out input events 202 not associated with the specified application function. Usability tracker 112 may identify input events 202 not associated with application 114 based on the input events occurring outside application 114 window.

Usability tracker 112 may capture the data associated with input events 202 associated with the specified application function. For example, usability tracker 112 may receive a broadcast message that indicates a first event of a first click on a particular part of the screen. Usability tracker 112 may also receive a broadcast message indicating the second event of a second click on a different screen. Based on the first and second events, usability tracker 112 may capture data associated with the average and total straight line distance between two clicks, distance traveled on a screen, the number of clicks performed, etc.

Usability tracker 112 may store the data associated with input events 202 in session information 116. Usability tracker 112 may correlate the data associated with input events 202 with the usage session, the specified application function, and user information in session information 116. Usability tracker 112 may transmit the data associated with input events 202, usage session information, specified application function information, and user information to central hub 100.

Figure 3:
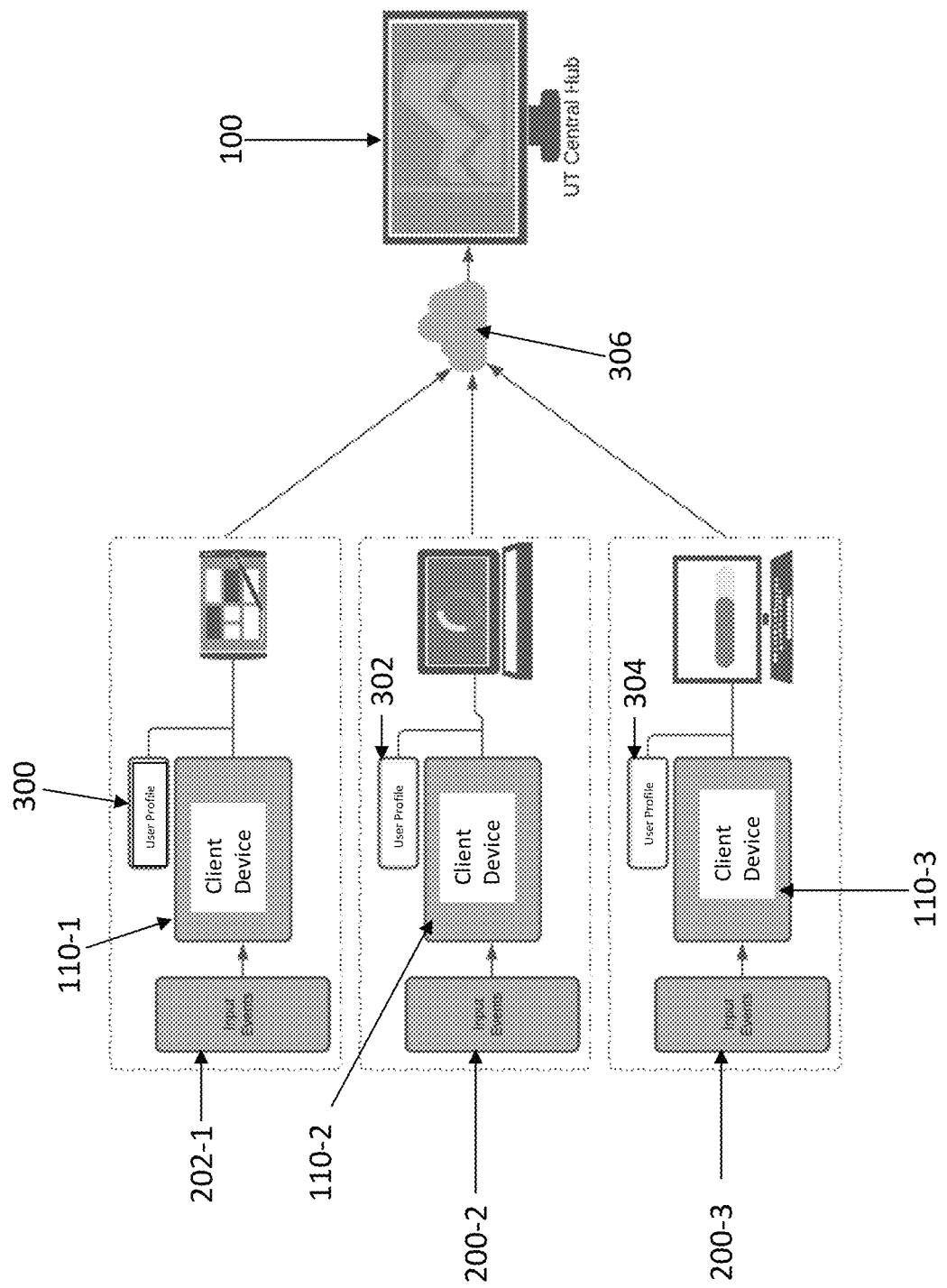
FIG. 3 is a block diagram illustrating the data flow to central hub 100 tracking application usage, according to some embodiments.

FIG. 3 is a block diagram illustrating the data flow to central hub 100 tracking application usage, according to some embodiments. FIG. 3 shall be described with reference to FIGS. 1-2.

As described above, central hub 100 may include dashboard engine 102. Furthermore, central hub 100 may be in communication with client devices 110-1, 110-2, and 110-3 via network 306. In some embodiments, central hub 100 may reside in a cloud computing environment.

Client device 110-1, 110-2, and 110-3 may implement an instance of application usability tracker 112. Furthermore, client devices 110-1, 110-2, and 110-3 may implement an instance of application 114. Client device 110-1, 110-2, and 110-3 may be used by UI/UX application designers to test application 114. Each of the UI/UX application designers may use a different type of client device. The types of client devices may be notebooks, phones/tablets, keyless terminals, etc. As such, client devices 110-1, 110-2, and 110-3 may be coupled to different types of input devices 204. Moreover, each of client device 110-1, 110-2, and 110-3 may implement different types of OSs. As a non-limiting example, client device 110-1 may be a mobile device, client device 110-2 may be a laptop, and client device 110-3 may be a personal computer (PC).

Furthermore, each of the UI/UX application designers may have different user profiles. For example, client device 110-1 may be associated with user profile 300, client device 110-2 may be associated with user profile 302, and client device 110-3 may be associated with user profile 304. User profiles 300, 302, and 304 may include user information such as demographic, technical expertise, experience, role, etc. User profiles 300-304 may be pseudo-user profiles for test users.

Usability tracker 112 of client device 110-1 my capture data associated with input events 202-1, as described above with respect to FIG. 2. Data associated with input events 202-1 may be inputs received with respect to application 114. The data associated with input events 202-1 may be associated with one or more application functions. Similarly, usability tracker 112 of client device 110-2 my capture data associated with input events 202-2, as described above with respect to FIG. 2. Data associated with input events 202-2 may be inputs received with respect to application 114. The data associated with input events 202-2 may be associated with one or more application functions. Moreover, usability tracker 112 of client device 110-3 my capture data associated with input events 202-3, as described above with respect to FIG. 2. Data associated with input events 202-3 may be inputs received with respect to application 114. As described above, as client device 110-1, client device 110-2, client device 110-3 may be different types of devices and be coupled to different types of input devices 204. As such, client devices 110-1, client device 110-2, and client device 110-3 produce different types of input events 200-1-200-3 from one another.

Usability tracker 112 of client device 110-1 may transmit the data associated with input events 202-1, usage session information, specified application function information, device type, and user profile 300 to central hub 100. Similarly, usability tracker 112 of client device 110-2 may transmit the data associated with input events 202-2, usage session information, specified application function information, device type, and user profile 302 to central hub 100. Moreover, usability tracker 112 of client device 110-3 may transmit the data associated with input events 202-3, usage session information, specified application function information, device type, and user profile 304 to central hub 100.

Central hub 100 may receive the data associated with input events 202-1-202-3, usage session information, specified application function information, device type, and user profiles 300-304 from client devices 110-1-110-3. Dashboard engine 102 may aggregate the data based on an attribute. Dashboard engine 102 may group the data associated with input events 202-1-202-3 into sets of data based on attributes such as project, application function, session type, test user persona, platform, device type, etc. The test user persona may correspond with user profiles 300-304. The test user persona may be used to analyze the usage patterns of different types of users.

Dashboard engine 102 may also group the sets of data into subsets of data based on the data type. For example, the data type may include session duration, click count, cursor travel distance, cursor travel between clicks, drag distance, x/y scroll, or straight-line travel between clicks.

Click count is the number of clicks received from input device 204 (e.g., a mouse) while executing an application function. The higher the click count, the more steps a user is executing for the application function. Cursor travel distance is the distance of a cursor (e.g., mouse cursor) traveled on the monitor while executing an application function. The greater the travel distance of the cursor, the more time it takes the user to complete the application function. Cursor travel between clicks is the distance of the cursor (e.g., mouse cursor) between two different clicks while executing the application function. The greater the travel distance of the cursor between clicks, the more time it takes the user to complete the application function. Drag distance may be a distance traveled by a mouse cursor on the monitor while dragging and dropping elements (e.g., files, icons, images, etc.) while executing the application function. The greater the drag distance, the more time it takes the user to complete the application function. The x/y scroll may be the amount a user scrolled vertically and horizontally while executing the application function. The greater the x-y scroll distance, the more time it takes to complete the application function. Straight-line travel between clicks is the distance the mouse cursor travels on a monitor in a straight line while executing the application function. The greater the straight distance of the cursor, the more time it takes the user to complete the application function. Characteristics such as additional time consumption, additional steps to be executed, and difficult processes indicate an inefficient UI/UX of an application.

Dashboard engine 102 may also rank the data associated with input events 202-1-202-3 based on parameters such as session duration, test users, or any other metric which needs such comparative analysis.

Dashboard engine 102 may analyze the data associated with input events 202-1-202-3 to generate metric data associated with application 114. The metric data may be for individual application functions of application 114. For example, the metric data may include session time, click counts, cursor travel distance, total distance between clicks, average travel time between clicks, cursor drag, scroll, etc. Dashboard engine 102 may generate a dashboard (e.g., GUI). The dashboard may include a graphical representation of the metric data. A UI/UX application designer may use client device 110-1-110-3 to access the dashboard.

In some embodiments, a UI/UX application designer may customize the dashboard based on their user preferences. The user preferences may include color, data organization, visual indicators, etc. The dashboard may also include charts and graphs that illustrate the metric data.

Figure 4A:
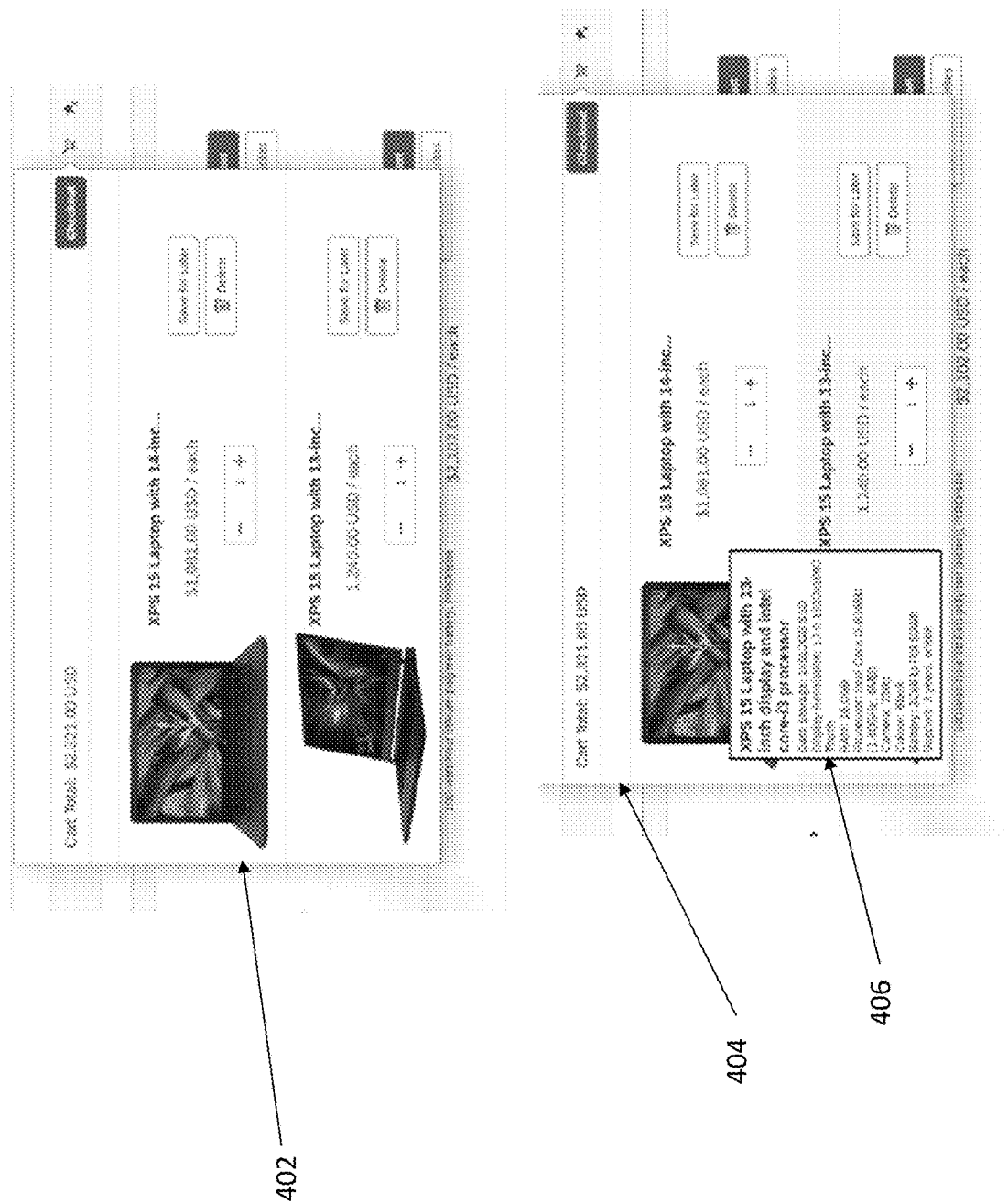
FIGS. 4A-4B are block diagrams illustrating an application being tested and the dashboard rendering the metric data, according to some embodiments.
Figure 4B:
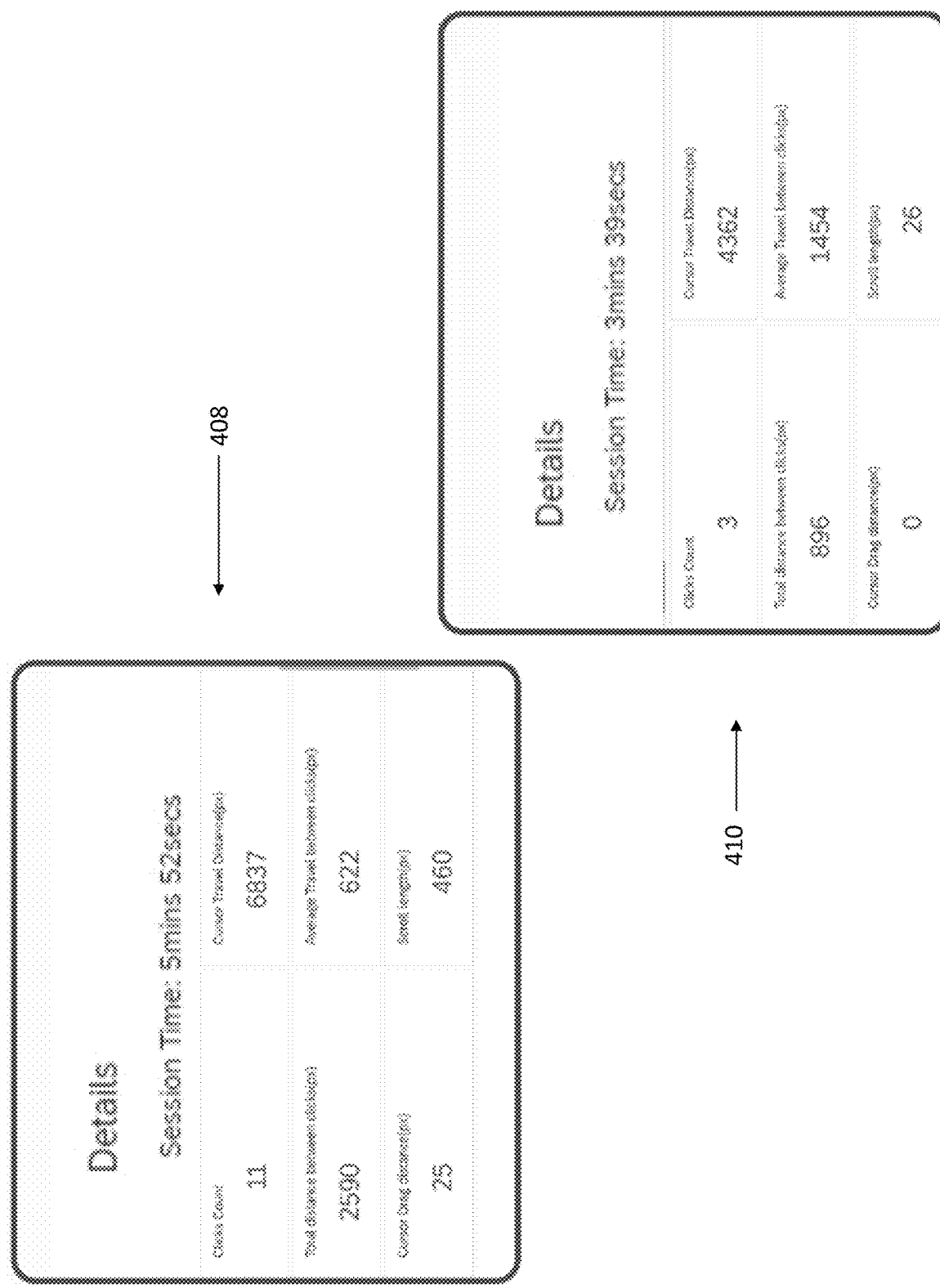

FIGS. 4A-4B are block diagrams illustrating an application being tested and the dashboard rendering the metric data, according to some embodiments. FIGS. 4A-4B shall be described with reference to FIG. 1.

With respect to FIG. 4A, design 402 and design 404 of application 114 are illustrated. Application 114 may be an e-commerce application. As such, application 114 may facilitate browsing and purchasing products. Design 402 and 404 may be associated with the application function of viewing product details.

Application 114 may include design 402 and design 404. Design 402 may correspond with a user interface that allows users to view their shopping cart, delete the items from the shopping cart, or purchase (e.g., checkout) the products. In order to view the details of the product from the cart or the catalog, a user has to open the product page and look for details.

A UI/UX application designer may test design 402 on client device 110. The UI/UX application designer may input a request on usability tracker 112 to track the input events with respect to design 402 of application 114. The request may include an identifier of application 114 and the application function. The UI/UX application designer may interact with design 402. The interactions may include attempting to input products in a virtual shopping cart and attempting to view the details of the product.

Usability tracker 112 may capture data associated with the input events based on the UI/UX application designer interaction with design 402. The data may include session duration, click count, cursor travel distance, cursor travel between clicks, drag distance, x/y scroll, or straight-line travel between clicks. Usability tracker 112 may store the data associated with the input events in session information 116. A local user of client device 110 (e.g., the UI/UX application designer) may access and view the data on client device 110 using usability tracker 112. Furthermore, usability tracker 112 may transmit the data to central hub 100.

Design 404 may correspond with a user interface that allows users to view their shopping cart, delete the items from the shopping cart, or purchase (e.g., checkout) the products. In order to view the details of the product from the cart or the catalog, a popover 406 may be rendered within the user interface, including the product details.

The UI/UX application designer may test design 404 on client device 110. The UI/UX application designer may input a request on usability tracker 112 to track the input events with respect to design 404 of application 114. The request may include an identifier of application 114 and the application function. The UI/UX application designer may interact with design 404. The interactions may include attempting to input products in a virtual shopping cart and attempting to view the details of the product.

Usability tracker 112 may capture data associated with the input events based on the UI/UX application designer interaction with design 402. The data may include session duration, click count, cursor travel distance, cursor travel between clicks, drag distance, x/y scroll, or straight-line travel between clicks. Usability tracker 112 may store the data associated with the input events in session information 116. A local user of client device 110 (e.g., the UI/UX application designer) may access and view the data on client device 110 using usability tracker 112. Furthermore, usability tracker 112 may transmit the data to central hub 100.

With respect to FIG. 4B, metric data 408 and 410 are illustrated. Usability tracker 112 or dashboard engine 102 may analyze the data associated with input events for designs 402 and 404 to generate metric data associated with designs 402 and 404. Usability tracker 112 or dashboard engine 102 may generate metric data 408 for design 402 and metric data 410 for design 404.

Metric data 408 may indicate that the session time was 5 minutes and 52 seconds, click count was 11, cursor travel distance (in terms of pixels) was 6837, total distance between clicks (in terms of pixels) was 2590, average travel between clicks (in terms of pixels) was 622, cursor drag (in terms of pixels) was 25, and scroll length (in terms of pixels) was 460.

Metric data 410 may indicate that the session time was 3 minutes and 39 seconds, click count was 3, cursor travel distance (in terms of pixels) was 4, total distance between clicks (in terms of pixels) was 2590, average travel between clicks (in terms of pixels) was 622, cursor drag (in terms of pixels) was 25, and scroll length (in terms of pixels) was 460.

A UI/UX application designer may analyze metric data 408 and 410 and conclude that adding popover 406 greatly reduces the session time, number of clicks, and cursor movement distance. This indicates that design 404 provides a better user experience, thereby directly impacting customer engagement. As such, the UI/UX application designer may determine that adding popover 406 to display the details improves the design of application 114, and therefore design 404 is a better design as compared to design 402.

In some embodiments, dashboard engine 102 may use metric data 408 and 410 to generate a dashboard. The dashboard may be a graphical representation to illustrate the usability of application 114.

FIGS. 5A-5D are block diagrams illustrating an application being tested and the dashboard rendering the metric data, according to some embodiments. FIGS. 5A-5D shall be described with reference to FIG. 1.

Figure 5A:
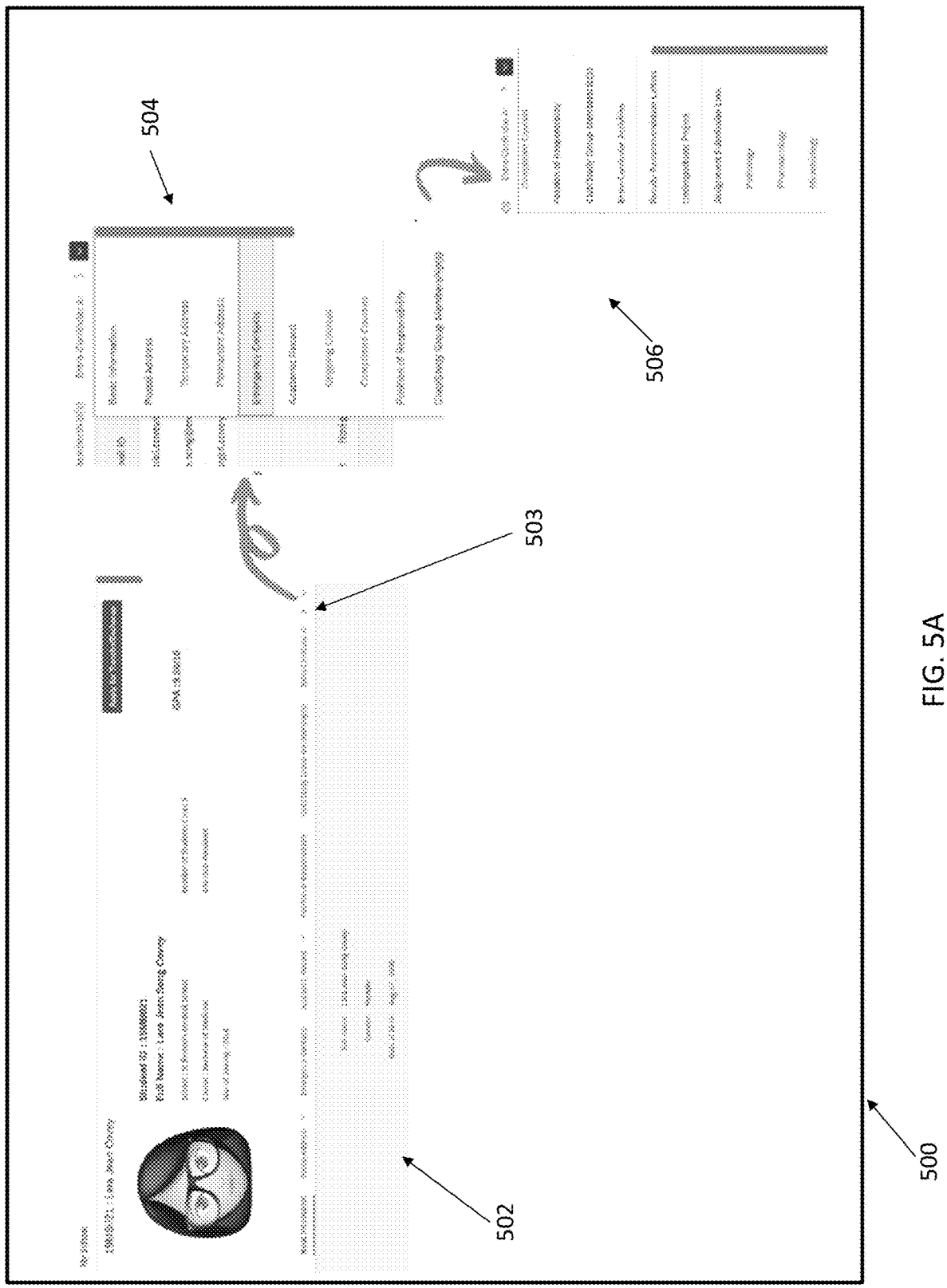

With respect to FIG. 5A, design 500 of application 114 is illustrated. Application 114 may include multiple tabs. Design 500 may be associated with the application function of adding and organizing tabs in application 114.

Design 500 may correspond with user interface 502 that allows users to view tabs. As shown in user interface 502, tabs 503 may have related tabs. As such, a user may need to select an arrow in tabs 503 to render the remaining tabs in a list shown in screen 504. The list may involve scrolling, as demonstrated on screen 506.

A UI/UX application designer may test design 500 on client device 110. The UI/UX application designer may input a request on usability tracker 112 to track the input events with respect to design 500 of application 114. The request may include an identifier of application 114 and the application function. The UI/UX application designer may interact with design 500. The interactions may include viewing/selecting tabs.

Usability tracker 112 may capture data associated with the input events based on the UI/UX application designer interaction with design 500. The data may include session duration, click count, cursor travel distance, cursor travel between clicks, drag distance, x/y scroll, or straight-line travel between clicks. Usability tracker 112 may store the data associated with the input events in session information 116. A local user of client device 110 (e.g., the UI/UX application designer) may access and view the data on client device 110 using usability tracker 112. Furthermore, usability tracker 112 may transmit the data to central hub 100.

With respect to FIG. 5B, metric data 508 is illustrated. Usability tracker 112 or dashboard engine 102 may analyze the data associated with input events for design 500 to generate metric data associated with design 500. Usability tracker 102 or dashboard engine 102 may generate metric data 508 for design 500.

Metric data 508 may indicate that the session time was 6 minutes and 52 seconds, click count was 12, cursor travel distance (in terms of pixels) was 4837, total distance between clicks (in terms of pixels) was 2590, average travel between clicks (in terms of pixels) was 403, cursor drag (in terms of pixels) was 257, and scroll length (in terms of pixels) was 160.

Figure 5C:
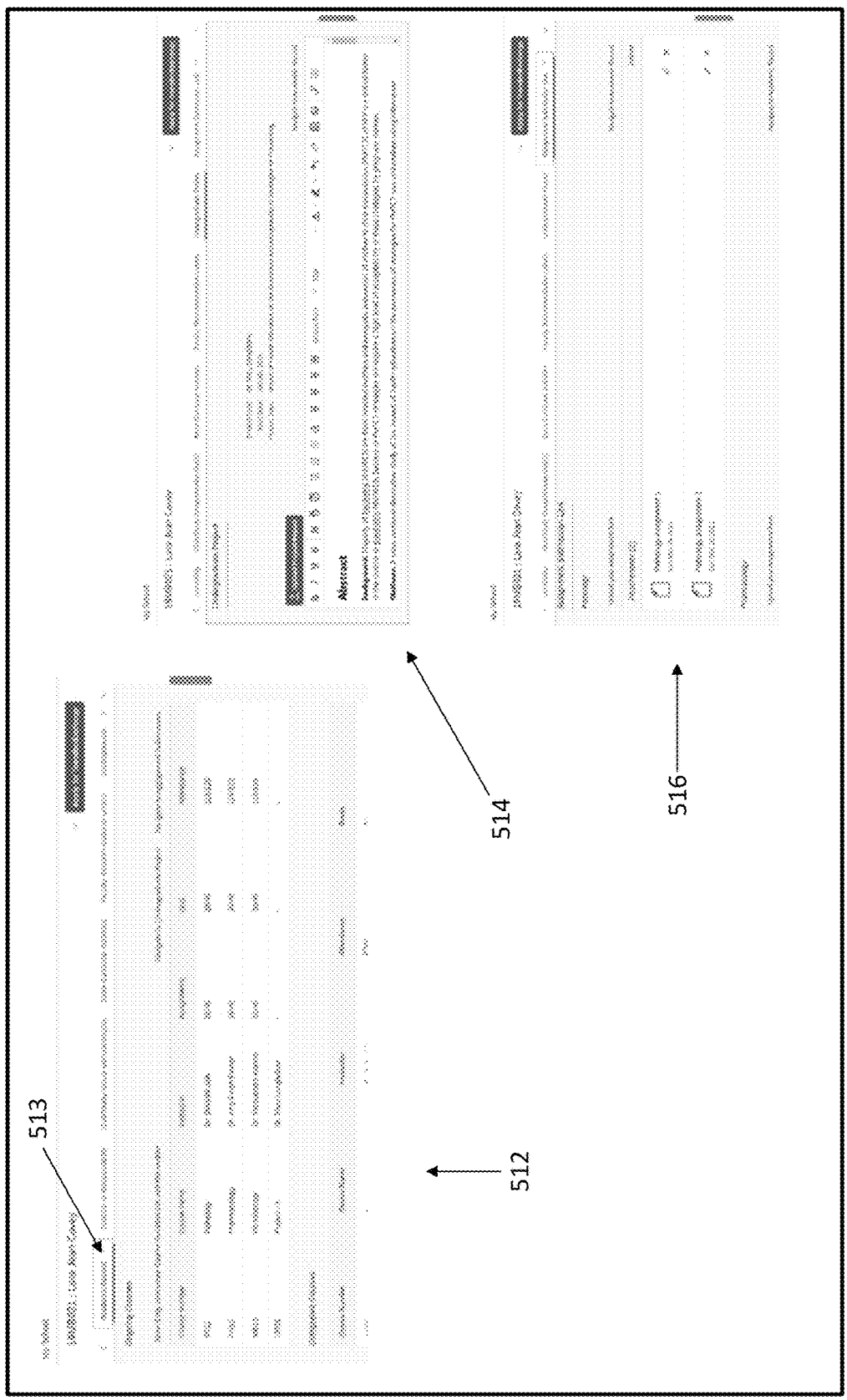

With respect to FIG. 5C, design 510 may correspond with user interface 512, allowing users to view tabs using tab shortcuts 513. As shown in user interface 512 and screen 514 and 516, each tab may include a shortcut 513 to the related tabs.

A UI/UX application designer may test design 510 on client device 110. The UI/UX application designer may input a request on usability tracker 112 to track the input events with respect to design 510 of application 114. The request may include an identifier of application 114 and the application function. The UI/UX application designer may interact with design 510. The interactions may include viewing/selecting tabs.

Usability tracker 112 may capture data associated with the input events based on the UI/UX application designer interaction with design 510. The data may include session duration, click count, cursor travel distance, cursor travel between clicks, drag distance, x/y scroll, or straight-line travel between clicks. Usability tracker 112 may store the data associated with the input events in session information 116. A local user of client device 110 (e.g., the UI/UX application designer) may access and view the data on client device 110 using usability tracker 112. Furthermore, usability tracker 112 may transmit the data to central hub 100.

With respect to FIG. 5D, metric data 518 is illustrated. Usability tracker 112 or dashboard engine 102 may analyze the data associated with input events for design 510 to generate metric data associated with design 510. Usability tracker 102 or dashboard engine 102 may generate metric data 518 for design 510.

Metric data 518 may indicate that the session time was 4 minutes and 13 seconds, click count was 7, cursor travel distance (in terms of pixels) was 2837, total distance between clicks (in terms of pixels) was 1666, average travel between clicks (in terms of pixels) was 414, cursor drag (in terms of pixels) was 0, and scroll length (in terms of pixels) was 248.

A UI/UX application designer may compare the dashboard 508 indicating the metric data for design 500 and metric data 518 indicating metric data for design 510 and determine that for design 510 the number of clicks is reduced to half with a considerable decrease in the session time and mouse movement distance as well. As such, design 510 provides a better user experience with respect to the application function of organizing tabs in application 114.

In some embodiments, dashboard engine 102 may use metric data 508 and 518 to generate a dashboard. The dashboard may be a graphical representation to illustrate the usability of application 114.

Figure 6A:
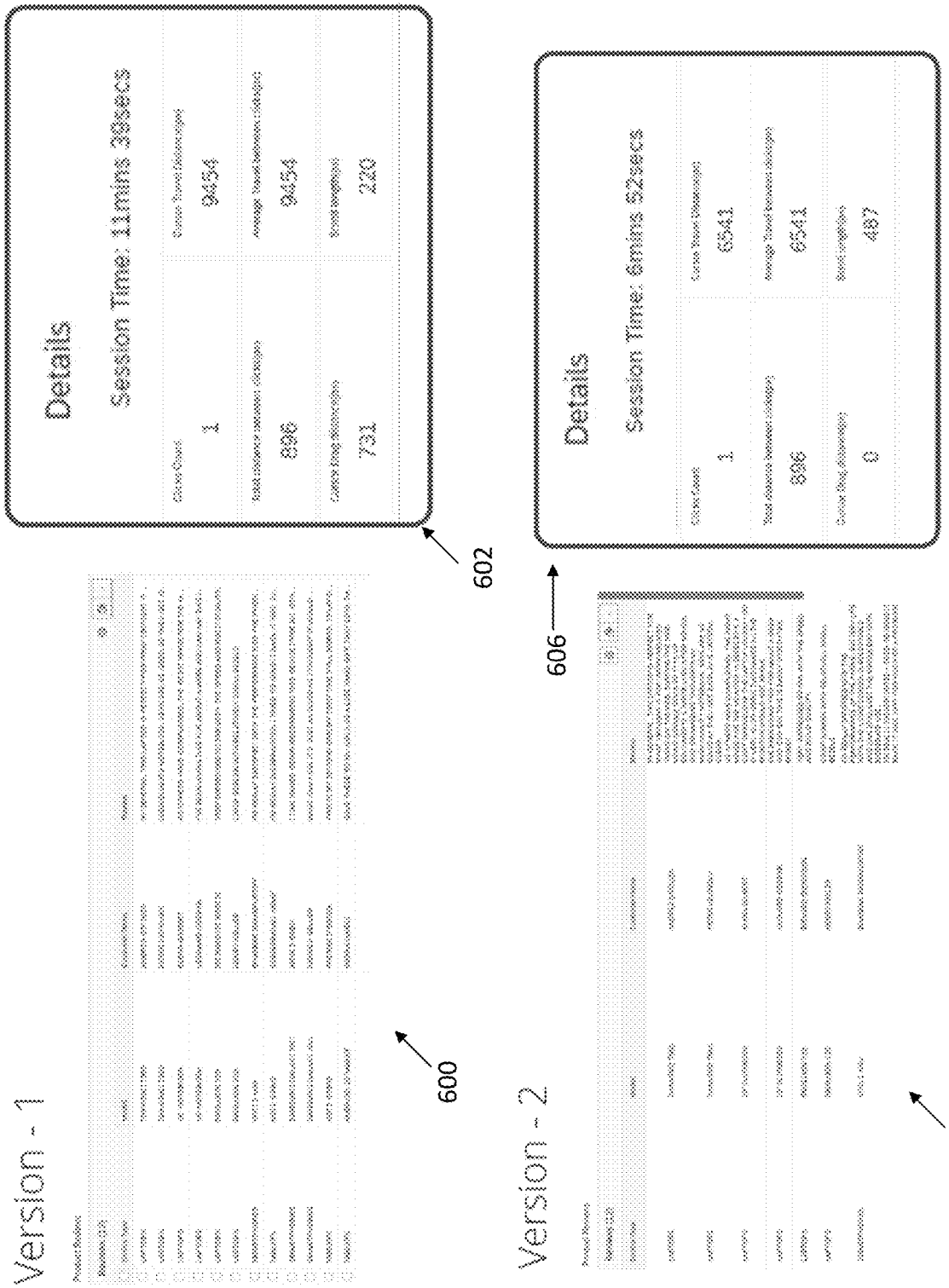
FIGS. 6A-6B are block diagrams illustrating an application being tested and the dashboard rendering the metric data, according to some embodiments.
Figure 6B:
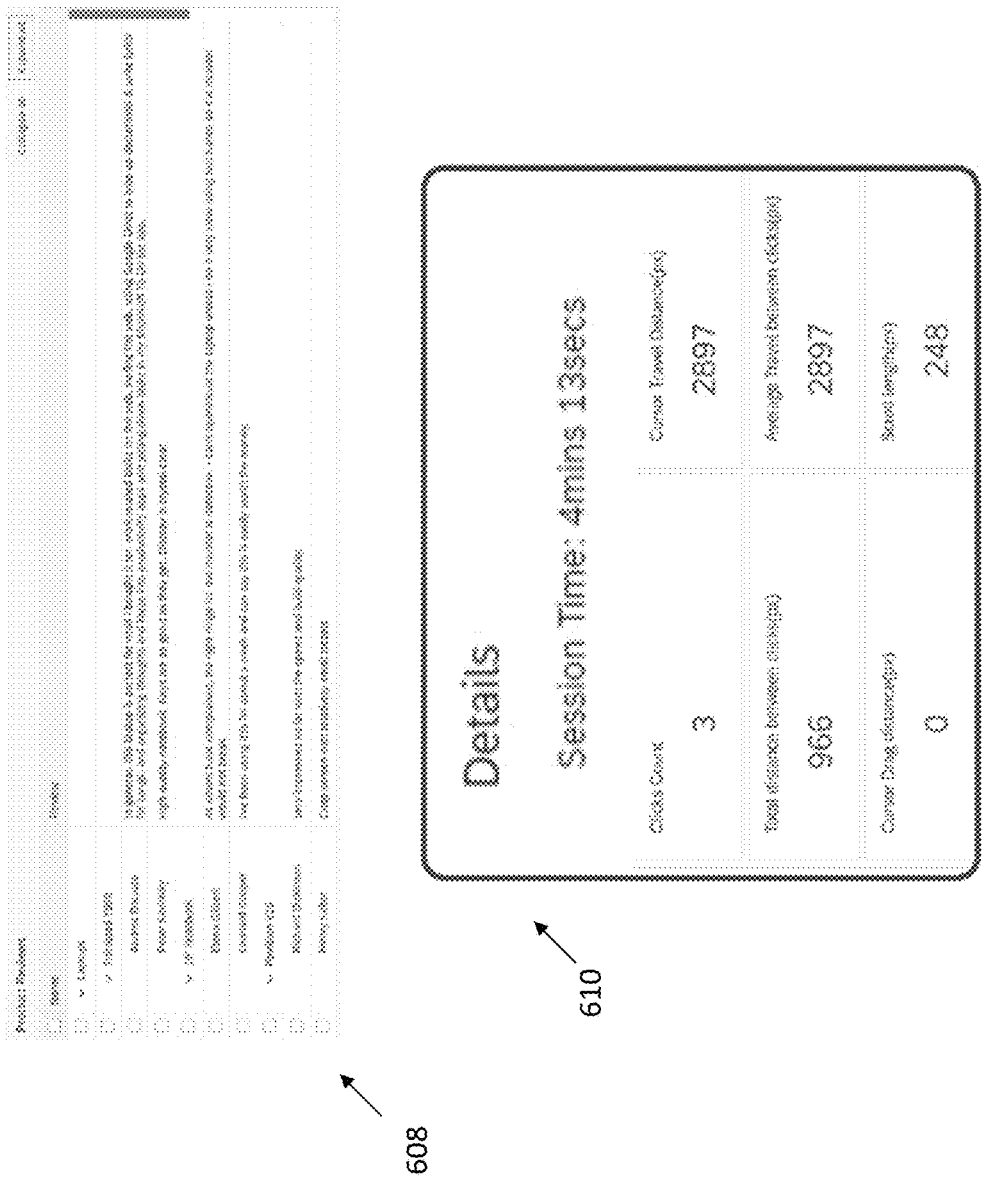

FIGS. 6A-6B are block diagrams illustrating an application being tested and the dashboard rendering the metric data, according to some embodiments. FIGS. 6A-6B shall be described with reference to FIG. 1.

With respect to FIG. 6A, designs 600 and 604 of application 114 are illustrated. Application 114 may display product reviews. Design 600 display the product reviews in a grid table. The long texts in the grid table may be truncated, and a user may need to drag the grid to view the entire text.

A UI/UX application designer may test design 600 on client device 110. The UI/UX application designer may input a request on usability tracker 112 to track the input events with respect to design 600 of application 114. The request may include an identifier of application 114 and the application function. The UI/UX application designer may interact with design 600 to execute the application function of viewing product reviews.

Usability tracker 112 may capture data associated with the input events based on the UI/UX application designer interaction with design 600. The data may include session duration, click count, cursor travel distance, cursor travel between clicks, drag distance, x/y scroll, or straight-line travel between clicks. Usability tracker 112 may store the data associated with the input events in session information 116. A local user of client device 110 (e.g., the UI/UX application designer) may access and view the data on client device 110 using usability tracker 112. Furthermore, usability tracker 112 may transmit the data to central hub 100.

Usability tracker 112 or dashboard engine 102 may analyze the data associated with input events for design 600 to generate metric data associated with design 600. Usability tracker 112 or dashboard engine 102 may generate metric data 602 for design 600.

Metric data 602 may indicate that the session time was 11 minutes and 39 seconds, click count was 1, cursor travel distance (in terms of pixels) was 9454, total distance between clicks (in terms of pixels) was 896 average travel between clicks (in terms of pixels) was 9454, cursor drag (in terms of pixels) was 731, and scroll length (in terms of pixels) was 220.

Design 604 may display the product reviews in a responsive table. The responsive table may include columns that are equal in width. Furthermore, the product reviews may be displayed in multiple lines in a narrow column.

A UI/UX application designer may test design 604 on client device 110. The UI/UX application designer may input a request on usability tracker 112 to track the input events with respect to design 604 of application 114. The request may include an identifier of application 114 and the application function. The UI/UX application designer may interact with design 604 to execute the application function of viewing product reviews.

Usability tracker 112 may capture data associated with the input events based on the UI/UX application designer interaction with design 604. The data may include session duration, click count, cursor travel distance, cursor travel between clicks, drag distance, x/y scroll, or straight-line travel between clicks. Usability tracker 112 may store the data associated with the input events in session information 116. A local user of client device 110 (e.g., the UI/UX application designer) may access and view the data on client device 110 using usability tracker 112. Furthermore, usability tracker 112 may transmit the data to central hub 100.

Usability tracker 112 or dashboard engine 102 may analyze the data associated with input events for design 604 to generate metric data associated with design 604. Usability tracker 112 or dashboard engine 102 may generate metric data 606 for design 604.

Metric data 606 may indicate that the session time was 6 minutes and 52 seconds, click count was 1, cursor travel distance (in terms of pixels) was 6541, total distance between clicks (in terms of pixels) was 896 average travel between clicks (in terms of pixels) was 6541, cursor drag (in terms of pixels) was 0, and scroll length (in terms of pixels) was 487.

With respect to FIG. 6B, design 608 of application 114 is illustrated. Design 608 display the product reviews in a tree table. The product reviews may be segregated into categories in the tree table, easily understandable, and have better readability.

A UI/UX application designer may test design 608 on client device 110. The UI/UX application designer may input a request on usability tracker 112 to track the input events with respect to design 608 of application 114. The request may include an identifier of application 114 and the application function. The UI/UX application designer may interact with design 608 to execute the application function of viewing product reviews.

Usability tracker 112 may capture data associated with the input events based on the UI/UX application designer interaction with design 608. The data may include session duration, click count, cursor travel distance, cursor travel between clicks, drag distance, x/y scroll, or straight-line travel between clicks. Usability tracker 112 may store the data associated with the input events in session information 116. A local user of client device 110 (e.g., the UI/UX application designer) may access and view the data on client device 110 using usability tracker 112. Furthermore, usability tracker 112 may transmit the data to central hub 100.

Usability tracker or dashboard engine 102 may analyze the data associated with input events for design 600 to generate metric data associated with design 608. Usability tracker 112 or dashboard engine 102 may generate metric data 610 for design 608.

Metric data 610 may indicate that the session time was 4 minutes and 13 seconds, click count was 3, cursor travel distance (in terms of pixels) was 2897, total distance between clicks (in terms of pixels) was 966 average travel between clicks (in terms of pixels) was 2897, cursor drag (in terms of pixels) was 0, and scroll length (in terms of pixels) was 248.

A UI/UX application designer may compare metric data 602 for design 600, metric data 606 for design 604, and metric data 610 for design 608. The UI/UX application designer may determine that for design 600 has the highest session time with a large drag distance, design 604 has large cursor movement due to lowered ease of readability with a moderate session time, and design 608 has the least session time and cursor travel distance with more number of clicks. The UI/UX application designer uses these determinations to select the best design that suits their goals.

In some embodiments, dashboard engine 102 may use metric data 602, 606, and 610 to generate a dashboard. The dashboard may be a graphical representation to illustrate the usability of application 114.

Figure 7:
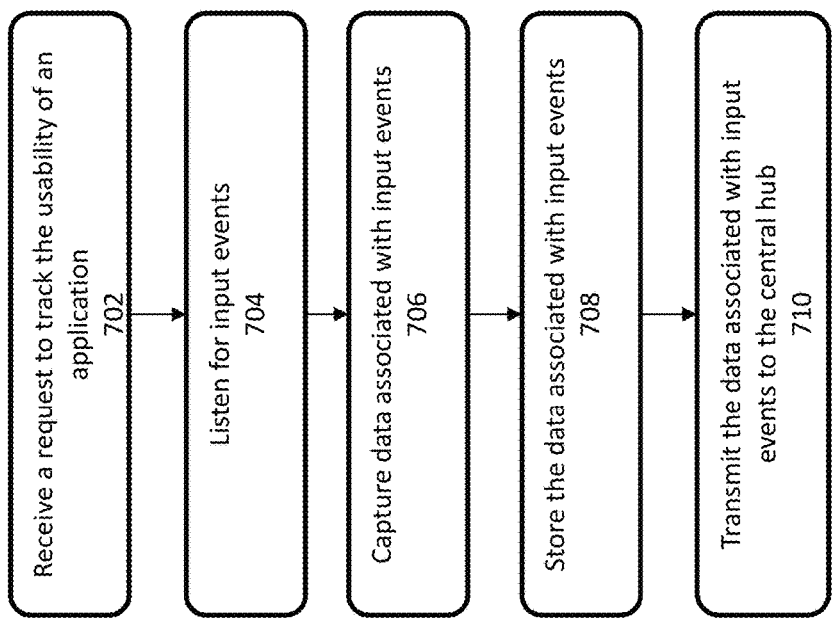
FIG. 7 is a flowchart illustrating a process for capturing data associated with input events, according to some embodiments.

FIG. 7 is a flowchart illustrating a process for capturing data associated with input events, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 7, as will be understood by a person of ordinary skill in the art.

Method 700 shall be described with reference to FIGS. 1-2. However, method 700 is not limited to that example embodiment.

In 702, usability tracker 112 receive input such that it is configured to track the usability of application 114 during a usage session. For example, a user may launch usability tracker 112 and may configured it based on the application type, platform (device type, operating system, etc.), so that usability tracker 112 is configured to capture the corresponding data. Usability tracker 112 and application 114 may reside on client device 110. Application 114 may include multiple application functions. The request may be associated with a particular application function.

In 704, usability tracker 112 listens for input events 202 associated with application 114 broadcast by operation system 200 on which application 114 is being executed. Input events 202 may correspond to the application function. Moreover, input events 202 may be received from input devices 204 coupled to client device 110. Input events 202 may be broadcast by operating system 200. Usability tracker 112 may be subscribed to receive input events 202 broadcast by operating system 200.

In 706, usability tracker 112 captures data associated with input events 202. The data is captured through I/O peripheral devices like a mouse, keyboard, touchpad, stylus, screen touch, etc. The data may be any input received from the I/O device with respect to application 114 along with the corresponding I/O device metadata. The input events may be movement of the input device, scrolling, panning, zooming, mouse clicks, screen touch, keyboard input, etc.

In 708, usability tracker 112 stores the data associated with input events 202 in a local storage device, such as session information 116. The data associated with input events 202 is correlated to the usage session and the application function in session information 116.

In 710, usability tracker 112 transmits the data associated with input events 202 to central hub 100. A local user of client device 110 may access and view the data associated with input events 202 on client device 110 using usability tracker 112.

Figure 8:
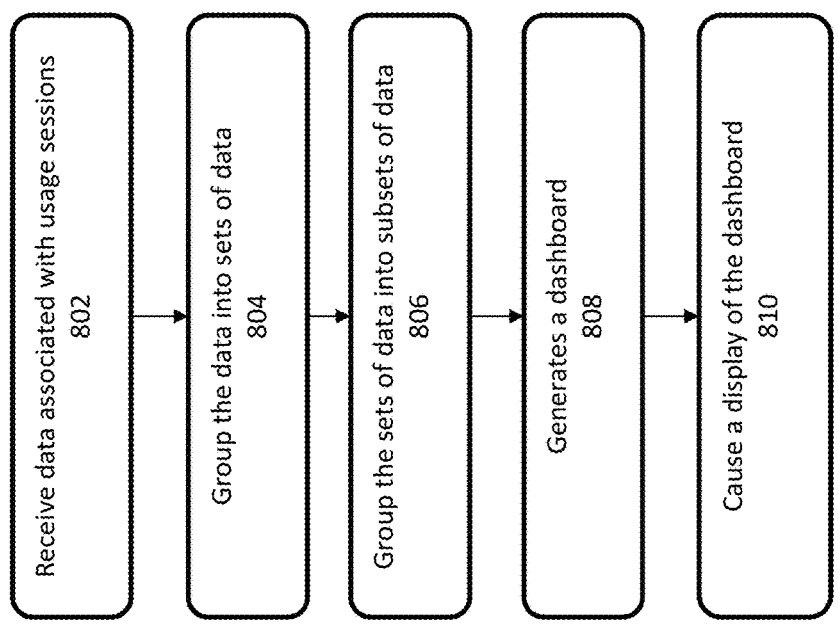
FIG. 8 is a flowchart illustrating the process of generating a dashboard including metric data associated with an application, according to some embodiments.

FIG. 8 is a flowchart illustrating the process of generating a dashboard including metric data associated with an application, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 8, as will be understood by a person of ordinary skill in the art.

Method 800 shall be described with reference to FIGS. 1-3. However, method 800 is not limited to that example embodiment.

In 802, central hub 100 receives data associated with usage sessions of application 114. The data is associated with input events 202 executed during the usage sessions. Central hub 100 may receive the data as described in method 700 of FIG. 7. Moreover, central hub 100 may receive the data from client devices 110-1-110-3. Client devices 110-1-110-3 may be different types of devices and associated with different user profiles 300-304.

In 804, the central hub 100 groups the data into different sets of data based on the projects or applications which are tested using the usability tracker solution. Each of these projects may constitute multiple usage sessions which have captured their respective session information 116.

In 806, central hub 100 groups the sets of data into subsets of data based on an attribute. The attribute may be a project, session type, test user persona, platform, device, application function, etc. This may depend on the type of analysis a UI/UX application designer is attempting to execute. For example, the UI/UX application designer may be attempting to test the UI/UX of application 114 based on device type, user profile type, platform, etc. As such, central hub 100 may group the data based on one or more of these attributes. Each of these subsets may contain data points such as those mentioned in 706 which will be used by the UI/UX designer to analyse the design being tested.

In 808, central hub 100 generates a dashboard including the subsets of data. The subsets of data may be metric data for application 114. The subsets of data may provide insight into the usability of application 114.

In 810, central hub 100 causes a display of the dashboard, including the subsets of data. A user (e.g., a UI/UX application designer) may access the dashboard using client device 110 or user device 130.

Figure 9:
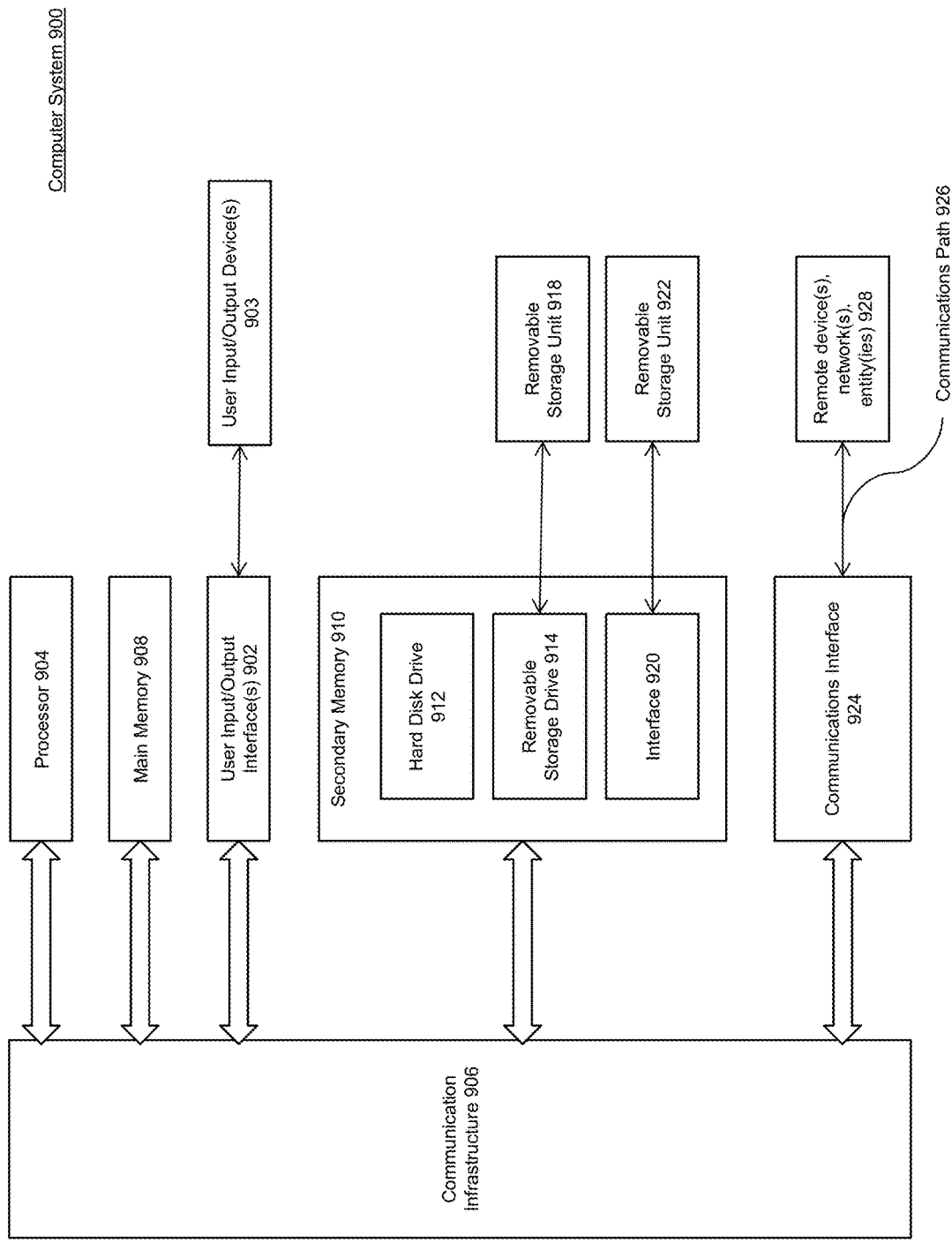
FIG. 9 is an example computer system useful for implementing various embodiments.

Various embodiments can be implemented, for example, using one or more computer systems, such as computer system 900 shown in FIG. 9. Computer system 900 can be used, for example, to implement methods 700 of FIG. 7 and method 800 of FIG. 8. Furthermore, computer system 900 can be at least part of central hub 100, client device 110, data storage device 120, and user device 130, as shown in FIG. 1. For example, computer system 900 route communication to various applications. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 can include one or more levels of cache. Main memory 908 has stored therein control logic (i.e., computer software) and/or data.

Computer system 900 can also include one or more secondary storage devices or memory 910. Secondary memory 910 can include, for example, a hard disk drive 912 and/or a removable storage device or drive 914. Removable storage drive 914 can be a floppy disk drive, a magnetic tape drive, a compact disk drive, an optical storage device, tape backup device, and/or any other storage device/drive.

Removable storage drive 914 can interact with a removable storage unit 918. Removable storage unit 918 includes a computer usable or readable storage device having stored thereon computer software (control logic) and/or data. Removable storage unit 918 can be a floppy disk, magnetic tape, compact disk, DVD, optical storage disk, and/ any other computer data storage device. Removable storage drive 914 reads from and/or writes to removable storage unit 918 in a well-known manner.

According to an exemplary embodiment, secondary memory 910 can include other means, instrumentalities, or other approaches for allowing computer programs and/or other instructions and/or data to be accessed by computer system 900. Such means, instrumentalities, or other approaches can include, for example, a removable storage unit 922 and an interface 920. Examples of the removable storage unit 922 and the interface 920 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 can further include a communication or network interface 924. Communication interface 924 enables computer system 900 to communicate and interact with any combination of remote devices, remote networks, remote entities, etc. (individually and collectively referenced by reference number 928). For example, communication interface 924 can allow computer system 900 to communicate with remote devices 928 over communications path 926, which can be wired and/or wireless, and which can include any combination of LANs, WANs, the Internet, etc. Control logic and/or data can be transmitted to and from computer system 900 via communication path 926.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments, but should be defined only in accordance with the following claims and their equivalents.

What is claimed is:

1. A method for tracking usability of an application, the method comprising:
   receiving, by a processor, an input to track the usability of the application during a usage session;
   listening, by the processor, for one or more input events associated with the application and broadcast by an operating system on which the application is being executed, wherein the one or more events correspond to an application function;
   capturing, by the processor, data associated with the one or more input events, wherein the data comprises one or more of cursor travel distance and cursor travel between clicks;
   storing, by the processor, the data associated with the one or more input events in a local storage device, wherein the data associated with the one or more input events is correlated to the usage session and the application function in the local storage device; and
   transmitting, by the processor, the data associated with the one or more input events to a central hub.

2. The method of claim 1, wherein the one or more input events are inputs received from one or more input/output (I/O) peripheral devices.

3. The method of claim 1, wherein the data associated with the one or more input events includes: session duration, click count, drag distance, x/y scroll, or straight line travel between clicks.

4. The method of claim 1, further comprising:
   transmitting, by the processor, other data associated with other input events corresponding to other sessions to the central hub, wherein the other data and the other input events correspond to the application function.

5. The method of claim 4, wherein the central hub aggregates the data associated with the one or more input events and the other data associated with the other input events into groups based on data type, and outputs the data and other data based on the groups.

6. The method of claim 1, wherein transmitting the data associated with the one or more input events to the central hub further comprises:
   transmitting, by the processor, user information of a user who associated with the usage session.

7. A system for tracking usability of an application, the system comprising:
   a memory; and
   a processor coupled to the memory, wherein the processor is configured to:
   receive data associated with a plurality of usage sessions of an application, wherein the data is associated with input events executed during the plurality of usage sessions, and wherein the data comprises one or more of cursor travel distance and cursor travel between clicks;
   group the data into a plurality of sets of data based on an attribute of each set of data in the plurality of sets of data;

group the plurality of sets of data into a plurality of subsets of data based on data type, wherein each subset of the plurality of subsets of data corresponds with a different data type; and cause display of a graphical user interface (GUI) comprising the plurality of subsets of data.

8. The system of claim 7, wherein the input events are inputs received from one or more input/output (I/O) peripheral devices.

9. The system of claim 7, wherein the processor is further configured to:

rank the plurality of sets of data based on the attribute.

10. The system of claim 7, wherein the attribute is one of project type, session type, user type, platform type, or device type.

11. The system of claim 7, wherein the processor is further configured to generate the GUI based on one or more user preferences.

12. A non-transitory computer-readable medium having instructions stored thereon that, when executed by at least one computing device, cause the at least one computing device to perform operations comprising:

receiving an input to track usability of an application;

capturing data associated with one or more input events over a plurality of user sessions, wherein each input event of the one or more input events is broadcast by an operating system on which the application is being executed, and wherein the one or more input events correspond with an application function, and wherein the data comprises one or more of cursor travel distance and cursor travel between clicks;

storing the data in a local storage device, wherein the data are correlated to a respective usage session of the plurality of user sessions and the application function;

grouping the data into a plurality of sets of data. based on an attribute of each set of data in the plurality of sets of data;

grouping the plurality of sets of data into a plurality of subsets of data based on data type, wherein each subset of the plurality of subsets of data corresponds with a different data type; and causing display of an graphical user interface (GUI) comprising the plurality of subsets of data.

13. The non-transitory computer-readable medium of claim 12, wherein the one or more input events are inputs received from one or more input/output (11O) peripheral devices.

14. The non-transitory computer-readable medium of claim 12, wherein the operations further comprise: ranking the plurality of sets of data based on the attribute.

15. The non-transitory computer-readable medium of claim 13, wherein the attribute is one of project type, session type, user type, platform type, or device type.

16. The non-transitory computer-readable medium of claim 13, wherein the operations further comprise generating the GUI based on one or more user preferences.

17. The non-transitory computer-readable medium of claim 13, wherein the data type includes: movement of an input device, scrolling, panning, zooming, mouse clicks, screen touch, or keyboard input.

18. The method of claim 1, wherein the capturing comprises capturing a first set of data for a first design of a user interface associated with the application, and capturing a second set of data for a second design of the user interface.

19. The method of claim 1, wherein the one or more events comprise an idle event between inputs.

* * * * *